US011388241B1

(12) United States Patent
Myers, Jr. et al.

(10) Patent No.: US 11,388,241 B1
(45) Date of Patent: Jul. 12, 2022

(54) DISTRIBUTED PROCESSING IN A VEHICLE NETWORKING SYSTEM

(71) Applicant: Ethernovia Inc., San Jose, CA (US)

(72) Inventors: Roy T. Myers, Jr., Santa Clara, CA (US); Hossein Sedarat, San Jose, CA (US); Ramin Shirani, Morgan Hill, CA (US); Darren S. Engelkemier, Menlo Park, CA (US)

(73) Assignee: Ethernovia Inc., San Jose, CA (US)

( * ) Notice: Subject to any disclaimer, the term of this patent is extended or adjusted under 35 U.S.C. 154(b) by 355 days.

(21) Appl. No.: 16/752,088

(22) Filed: Jan. 24, 2020

Related U.S. Application Data

(60) Provisional application No. 62/797,058, filed on Jan. 25, 2019.

(51) Int. Cl.
*G01C 22/00* (2006.01)
*H04L 67/125* (2022.01)
*G05D 1/02* (2020.01)
*H04W 4/44* (2018.01)

(52) U.S. Cl.
CPC ......... *H04L 67/125* (2013.01); *G05D 1/0285* (2013.01); *H04W 4/44* (2018.02)

(58) Field of Classification Search
CPC ...... H04L 67/125; H04W 4/44; G05D 1/0285
See application file for complete search history.

(56) References Cited

U.S. PATENT DOCUMENTS 10,558,224 B1 * 2/2020 Lin ..................... G05D 1/0285
2020/0073381 A1 * 3/2020 Wang .................. G05D 1/0088

* cited by examiner

*Primary Examiner* — Adam M Alharbi
(74) *Attorney, Agent, or Firm* — Schwegman Lundberg & Woessner, P.A.

(57) ABSTRACT

Disclosed are systems, methods, and non-transitory computer-readable media for distributed processing in a vehicle networking system. A node in the vehicle networking system receives sets of processed sensor data from multiple nodes in the vehicle networking system. Each set of processed sensor data is generated using a first portion of a data processing algorithm on sensor data captured by different sets of sensors of the vehicle networking system. The node performs a second portion of the data processing algorithm based on the sets of processed sensor data received from multiple nodes, yielding a set of processed aggregated sensor data. The node may use the set of processed aggregated sensor data to provide a computer managed feature and/or transmit the set of processed aggregated sensor data to other nodes in the vehicle networking system.

20 Claims, 11 Drawing Sheets

DISTRIBUTED PROCESSING IN A VEHICLE NETWORKING SYSTEM

CROSS-REFERENCE TO RELATED APPLICATIONS

The present application claims the benefit of priority of U.S. Provisional Application No. 62/797,058, filed on Jan. 25, 2019, which is incorporated herein by reference in its entirety.

TECHNICAL FIELD

An embodiment of the present subject matter relates generally to a vehicle networking system, and more specifically, to distributed processing in a vehicle networking system.

BACKGROUND

Modern vehicles include many computer managed features. For example, vehicles include computers that monitor and/or control engine emissions, tire pressure, throttle position, engine temperature, spark plugs, fuel injection, automatic transmission, anti-lock brakes, automated driving, keyless entry, climate control, motorized seats and mirrors, entertainment systems (e.g., radio, compact disk player), cruise control, etc. To provide these computer managed features, vehicles are equipped with multiple sensors that continuously gather sensor data and provide the sensor data to computers (e.g., Electronic Control Unit (ECU)) included in the vehicle. In turn, each computer analyzes the received sensor data and provides control commands to actuators and/or output devices as needed to provide the computer managed feature. For example, sensor data describing wheel speed is analyzed by a computer to control brakes when providing anti-lock braking functionality. As another example, sensor data from temperature sensors is analyzed by a computer to adjust climate settings or display a current temperature when providing automated climate control functionality. To provide advanced functions, such as automated driving, a computer uses sensor data gathered by multiple sensors located at various points on the vehicle. Often, this sensor data is combined by the computer to generate a comprehensive representation of the vehicle's surroundings, which is then used to determine which actions should be executed by the vehicle.

Currently, vehicles utilize a centralized computing architecture in which the various sensors and actuators deployed in the vehicle are directly connected to a single central computer. The central computer performs all of the data analysis and control functions based on the received sensor data. For example, to provide automated driving functionality, the central computer receives sensor data from each sensor, combines the sensor data to generate a comprehensive representation of the vehicle's surroundings, and transmits commands to the actuators based on the vehicle's surroundings.

While a centralized computing architecture can be a workable solution, it also has multiple drawbacks. As a practical matter, a centralized computing architecture requires a large amount of cabling, which adds excessive weight to the vehicle and negatively effects fuel efficiency. Further, installing the complex wiring system is labor intensive, thereby increasing both the time and cost associated with manufacturing the vehicle. A centralized computer also has a high power requirement, which increases heat and associated heat dissipation. These issues have become even larger concerns as the number of sensors and computers included in vehicles continues to increase.

More importantly, a centralized computing architecture negatively affect the functional safety of the vehicle. Processing sensor data at a central computer increases system reaction time due to the amount of sensor data that is processed by the central computer. Any increase in reaction time negatively effects the speed at which the vehicle performs mission critical features to avoid possible catastrophe. For example, an increase in reaction time when providing autonomous driving may result in a deadly collision. Further, a central computer represents a single point of system failure at which any single failure may cause the entire system to fail. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
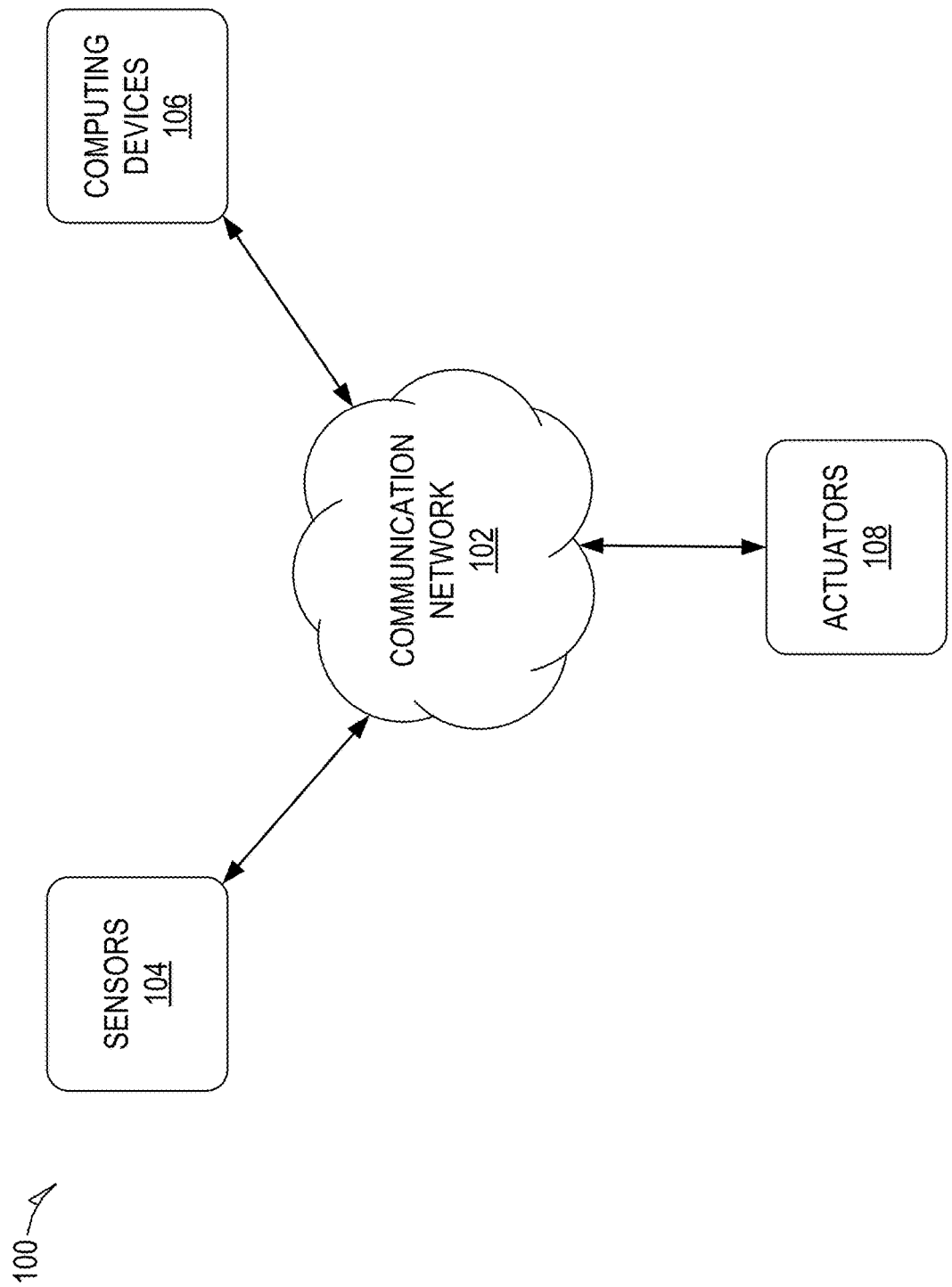
FIG. 1 shows a vehicle networking system, according to certain example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for distributed processing in a vehicle networking system. A vehicle networking system is a network of interconnected nodes (e.g., ECUs, sensors, actuators, output devices (e.g., displays, lights, etc,), etc.) implemented within a vehicle (e.g., car, train, plane, etc.). The various nodes within the vehicle networking system communicate with each other to provide computer managed features, such as driver assisted functions to full autonomous driving.

Currently, vehicle networking systems utilize a centralized computing architecture in which the various sensors and actuators deployed in the vehicle are directly connected to a single central computer. The central computer performs all data analysis and control functions based on the received sensor data. For example, to provide automated driving functionality, the central computer receives sensor data from each sensor, combines the sensor data to generate a comprehensive representation of the vehicle's surroundings, and transmits commands to the actuators and/or output devices to perform specified actions based on the vehicle's surroundings. For example, the central computer may transmit a command to an actuator to cause the vehicle to brake, change trajectory, etc. As another example, the central computer may also send images of objects that are around the vehicle to a display or send audibled alerts to speakers both to inform and alert the driver.

As explained earlier, a centralized computing architecture requires a large amount of cabling to connect the sensors to the central computer, which adds excessive weight to the vehicle and negatively effects vehicle range (e.g., fuel efficiency or battery life). Further, installation of the complex wiring system is labor intensive, thereby increasing both the time and cost associated with manufacturing the vehicle. To alleviate these issues, a distributed processing architecture distributes the task of receiving and aggregating sensor data across multiple intermediate computing devices deployed in the vehicle networking system. For example, each intermediate computing devices is deployed between a separate set of sensors and a central computing device in the vehicle networking system. Each intermediate computing device receives sensor data from its corresponding set of sensors, which the intermediate computing device aggregates and then transmits to the central computing device. This type of distributed processing architecture optimizes the amount of cabling used to connect the nodes of the vehicle, as well as simplifies the wiring system.

In addition to distributing the process of aggregating the sensor data, the distributed processing architecture may distribute the task of processing the sensor data across multiple computing nodes. For example, edge computing devices may be implemented at each sensor to perform an initial portion of the sensor data processing prior to transmitting the sensor data to another computing device (e.g., a central computer or intermediate computing device) in the vehicle networking system. This process may be repeated at each additional computing device that receives the sensor data. For example, an intermediate computing device may perform additional processing of the sensor data it receives from its corresponding sensors prior to transmitting the aggregated sensor data to a central computer. Likewise, a central computer may further process the sensor data and/or aggregated sensor data it receives.

In some embodiments, the services provided by the vehicle networking system (e.g., automated driving, anti-lock brakes, climate control, etc.) may be distributed across multiple computing devices. For example, each computing device may be tasked with providing a subset of the services provided by the vehicle networking system. Each of these computing devices may receive sensor data (e.g., aggregated sensor data) from a subset of the sensors included in the vehicle networking system, which the respective computing device may use to provide its respective service. As a computing device may require sensor data received by other computing devices in the vehicle networking system, the computing devices may communicate with each other as needed to request/receive sensor data.

FIG. 1 shows a vehicle networking system 100, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the vehicle networking system 100 to facilitate additional functionality that is not specifically described herein.

The vehicle networking system 100 is a collection of nodes distributed within a vehicle (e.g., automobile, airplane, ship, etc.), which are interconnected via a communication network 102. The communication network 102 comprises communication links and segments for transporting data between nodes, such as sensors 104, computing devices 106, and actuators 108. Each node in the vehicle networking system 100 may be a redistribution point or an endpoint that can receive, create, store or send data along distributed network routes. For example. each node, whether an endpoint or a redistribution point, can have either a programmed or engineered capability to recognize, process and forward data transmissions to other nodes in the vehicle networking system 100. While the vehicle networking system 100 shows only sensors 104, computing devices 106 and actuators 108, this is not meant to be limiting. The vehicle networking system 100 may include any of a variety of networking nodes, example of which include sensors 104, displays, actuators 108, computing devices 106, routers, switches, input devices, speakers, other output devices, etc.

The communication network 102 is implemented using any number of nodes and communications links, including one or more wired communication links, one or more wireless communication links, or any combination thereof. Additionally, the communication network 102 is configured to support the transmission of data formatted using any number of protocols.

Multiple sensors 104, computing devices 106, and actuators 108 can be connected to the communication network 102. A computing device 106 is any type of general computing device capable of network communication with other computing devices. For example, a computing device 106 can include some or all of the features, components, and peripherals of the computing system 1100 shown in FIG. 11.

To facilitate communication with other computing devices 106, a computing device 106 includes a communication interface configured to receive a communication, such as a request, data, and the like, from another computing device 106 or sensor 104 in network communication with the computing device 106 and pass the communication along to an appropriate module running on the computing device 106. The communication interface also sends a communication to another computing device 106, actuator 108, and/or other node in network communication with the computing device 106.

The sensors 104 may be any type of sensors used to capture data. For example, the sensors 104 may include engine speed sensors, fuel temperature sensors, voltage sensors, pressure sensors, radar sensors, light detection and ranking (LIDAR) sensors, imaging sensors (e.g., camera, video camera), etc. The sensors 104 may capture data describing performance of a vehicle and its surroundings and provide the captured data to one or more of the computing devices 106 in the vehicle networking system 100.

The computing devices 106 use the captured sensor data to provide various computer managed features. For example, the computing devices 106 may use the gathered sensor data to monitor and/or control engine emissions, tire pressure, throttle position, engine temperature, spark plugs, fuel injection, automatic transmission, anti-lock brakes, automated driving, etc. The computing devices 106 may also use the gathered sensor data to provide non-critical luxury functions, such as keyless entry, climate control, motorized seats and mirrors, entertainment system (e.g., radio, compact disk player), cruise control, etc.

The actuators 108 are hardware components that are responsible for executing a mechanical/electrical action, such as moving and controlling a mechanism or system. Examples of actuators 108 include an on/off switch (e.g. door locks, lights, etc.), electric motors (e.g. side mirror, seat and steering wheel control), etc. The computing devices 106 transmit commands to the actuators 108 to perform a specified action. This category of network devices may also include any type of output devices that mostly consumes and/or outputs data, such as video displays and audio speakers.

As previously explained, the vehicle networking system 100 may utilize a distributed processing architecture to alleviate issues associated with use of a centralized computing architecture. A centralized computing architecture is described below in relation to FIG. 2 and is followed by a discussion of various embodiments of a distributed computing architecture, which are described in relation to FIGS. 3-10.

Figure 2:
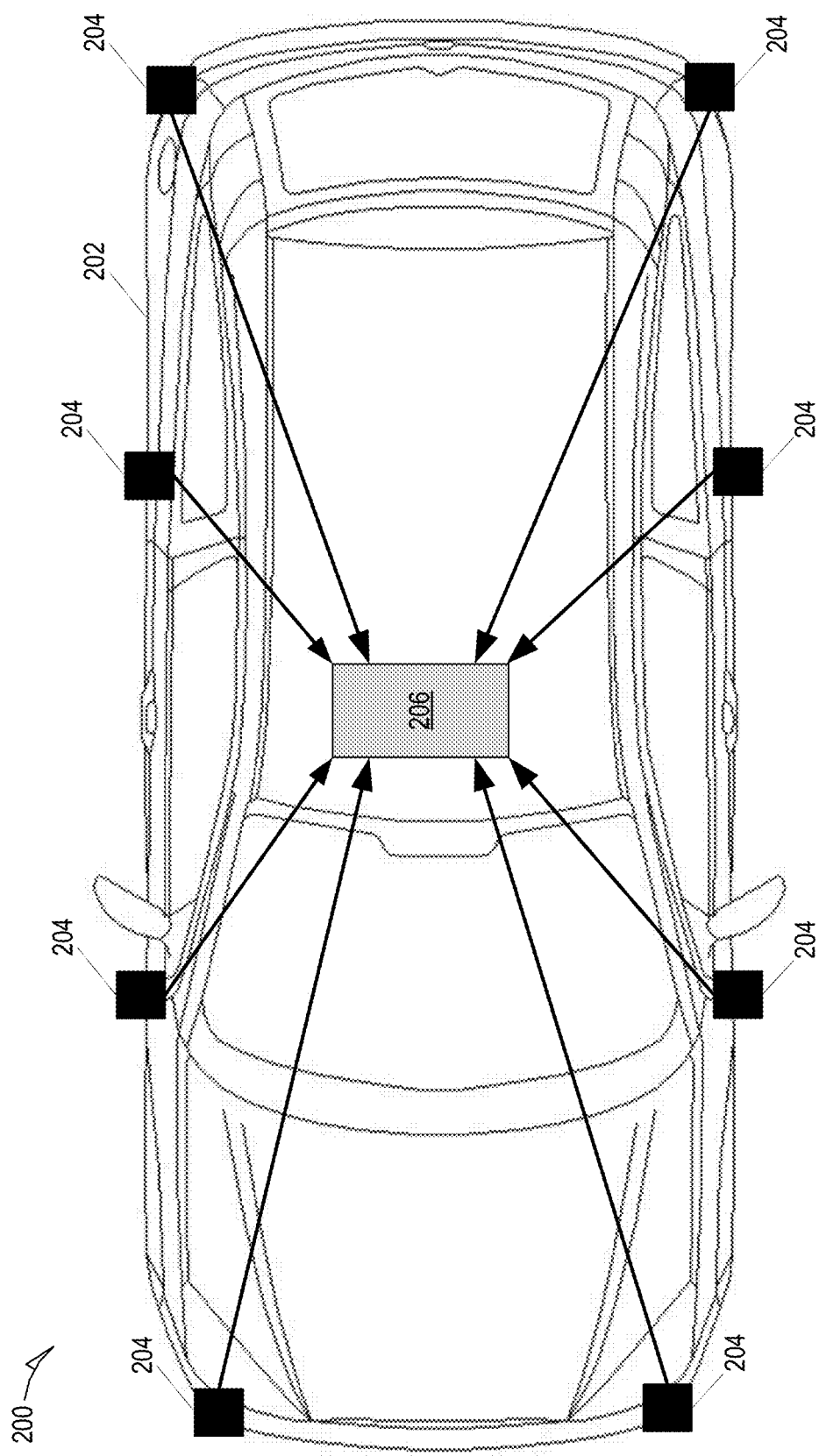
FIG. 2 is a block diagram of a vehicle networking system using a centralized computing architecture.

FIG. 2 is a block diagram of a vehicle networking system 200 using a centralized computing architecture. As shown, multiple sensors 204 are positioned throughout a vehicle 202 and are directly connected to a central computer 206. For example, the vehicle 202 includes two sensors 204 positioned along the front of the vehicle 202, two sensors 204 along both the passenger and driver sides of the vehicle 202, and two sensors 202 positioned along the rear of the vehicle. Although only eight sensors are show, this is for ease of explanation and is not meant to be limiting. The vehicle networking system 200 may include any number of sensors 204 that may be positioned at various locations of the vehicle 202, including on the exterior and interior of the vehicle 202, as well as within components and systems of the vehicle 202.

Each sensor 204 captures sensor data and transmits the sensor data to the central computer 206 via its direct connection to the central computer 206. The central computer 206 processes the sensor data it receives from all of the sensors 204, which it uses to provide various computer managed features. As explained earlier, a centralized computing architecture has multiple drawbacks. As a practical matter, a centralized computing architecture requires a large amount of cabling, which adds excessive weight to the vehicle 202 and negatively effects vehicle range. Further, installing the complex wiring system is labor intensive, thereby increases both the time and cost associated with manufacturing the vehicle 202. More importantly, a centralized computing architecture negatively affect the functional safety of the vehicle 202. Processing sensor data at a central computer 206 increases system reaction time due to the amount of sensor data that is transmitted to the central computer 206 and processed by the central computer 206. Any increase in reaction time negatively effects the speed at which the vehicle 202 performs mission critical features to avoid possible catastrophe. For example, an increase in reaction time when providing autonomous driving, may result in a deadly collision. Further, the central computer 206 represents a single point of system failure at which any single failure may cause the entire system to fail.

Figure 3:
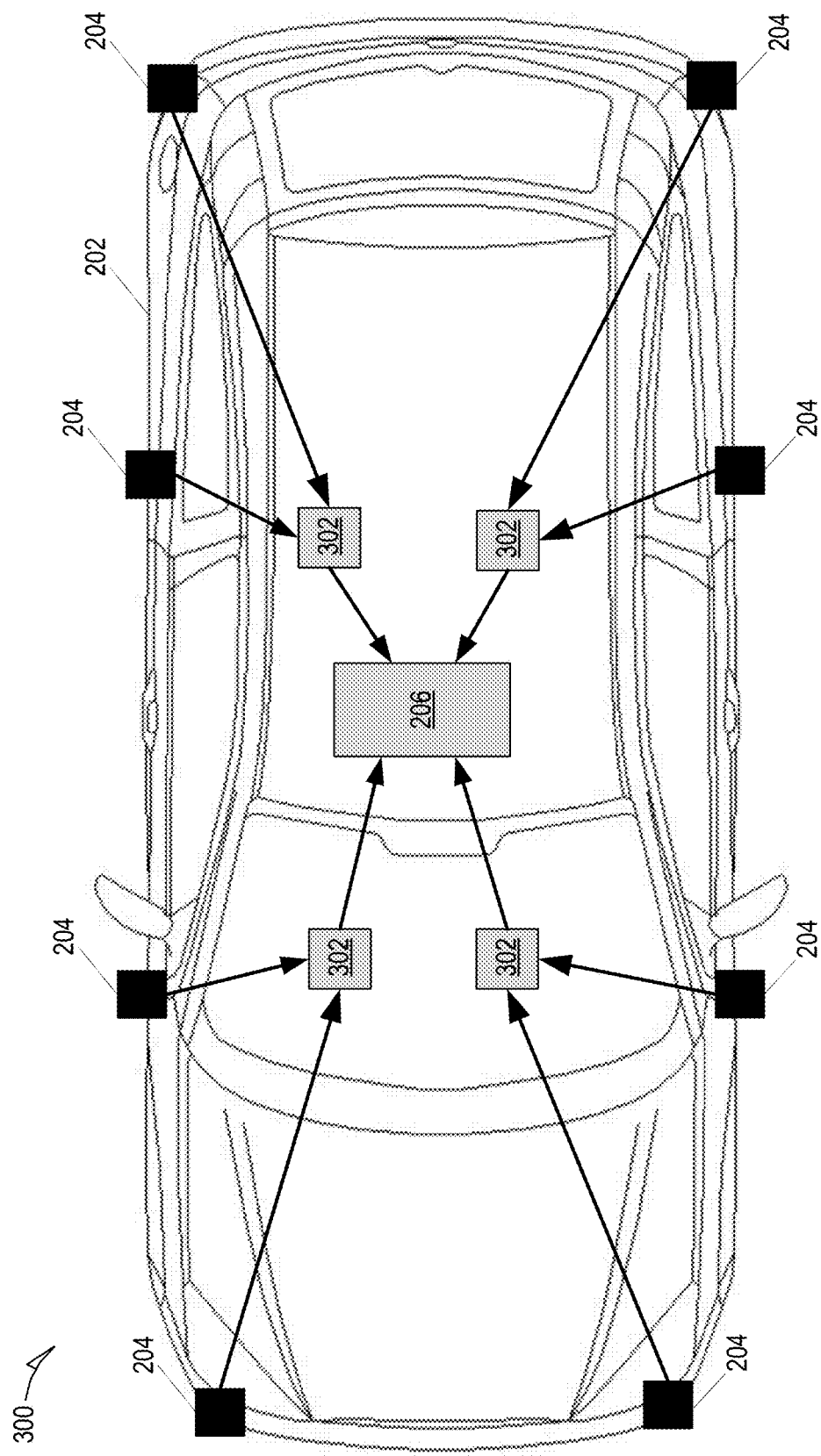
FIG. 3 is a block diagram of a vehicle networking system using a distributed computing architecture to aggregate sensor data, according to some example embodiments, according to certain example embodiments.

FIG. 3 is a block diagram of a vehicle networking system 300 using a distributed computing architecture to aggregate sensor data, according to certain example embodiments. As shown, the vehicle 202 includes sensors 204 positioned at various locations of the vehicle 202 and a central computer 206 that receives sensor data from each sensor 204. In contrast to the vehicle networking system 200 shown in FIG. 2, however, the vehicle networking system 300 includes intermediate computing devices 302 positioned between the sensors 204 and the central computer 206 through which the sensor data captured by each sensor 204 flows en route to the central computer 206.

Each intermediate computing device 302 receives sensor data from a subset of the sensors 204 in the vehicle networking system 300. For example, the intermediate computing device 302 positioned on the front driver's side of the vehicle 202 (bottom left) receives sensor data from one of the sensors 204 positioned along the front of the vehicle 202 and one of the sensors 204 positioned along the driver's side of the vehicle. Similarly, the intermediate computing device 302 positioned on the front passenger's side of the vehicle 202 (top left) receives sensor data from one of the sensors 204 positioned along the front of the vehicle 202 and one of the sensors 204 positioned along the passenger's side of the vehicle 202. The intermediate computing device 302 positioned on the rear driver's side of the vehicle 202 (bottom right) receives sensor data from one of the sensors 204 positioned along the rear of the vehicle 202 and one of the sensors 204 positioned along the driver's side of the vehicle 202. Finally, the intermediate computing device 302 positioned on the rear passenger's side of the vehicle 202 (top right) receives sensor data from one of the sensors 204 positioned along the rear of the vehicle 202 and one of the sensors 204 positioned along the passenger's side of the vehicle 202. Although the vehicle networking system 300 is shown as including only four intermediate computing devices 302, this is not meant to be limiting. The vehicle networking system 300 may include any number of intermediate computing devices 302.

Each intermediate computing device 302 aggregates the sensor data it receives from the subset of sensors 204 that are in direct communication with the intermediate computing device 302. Aggregating the sensor data may include combining, ordering, and/or filtering the sensor data received from each sensor 204 to result in a single data output generated from the sensor data received from each sensor 204. The intermediate computing devices 302 transmit the aggregated sensor data to the central computer 206, where it may be further aggregated and/or processed to provide various computer managed features.

The use of the intermediate computing devices 302 to receive and aggregate sensor data alleviates some of the issues with use of a centralized computing architecture. For example, the distributed computing architecture shown in FIG. 3 optimizes the amount of cabling used to connect the sensors 204 to the central computer 206, as well as simplifies the wiring system.

Figure 4:
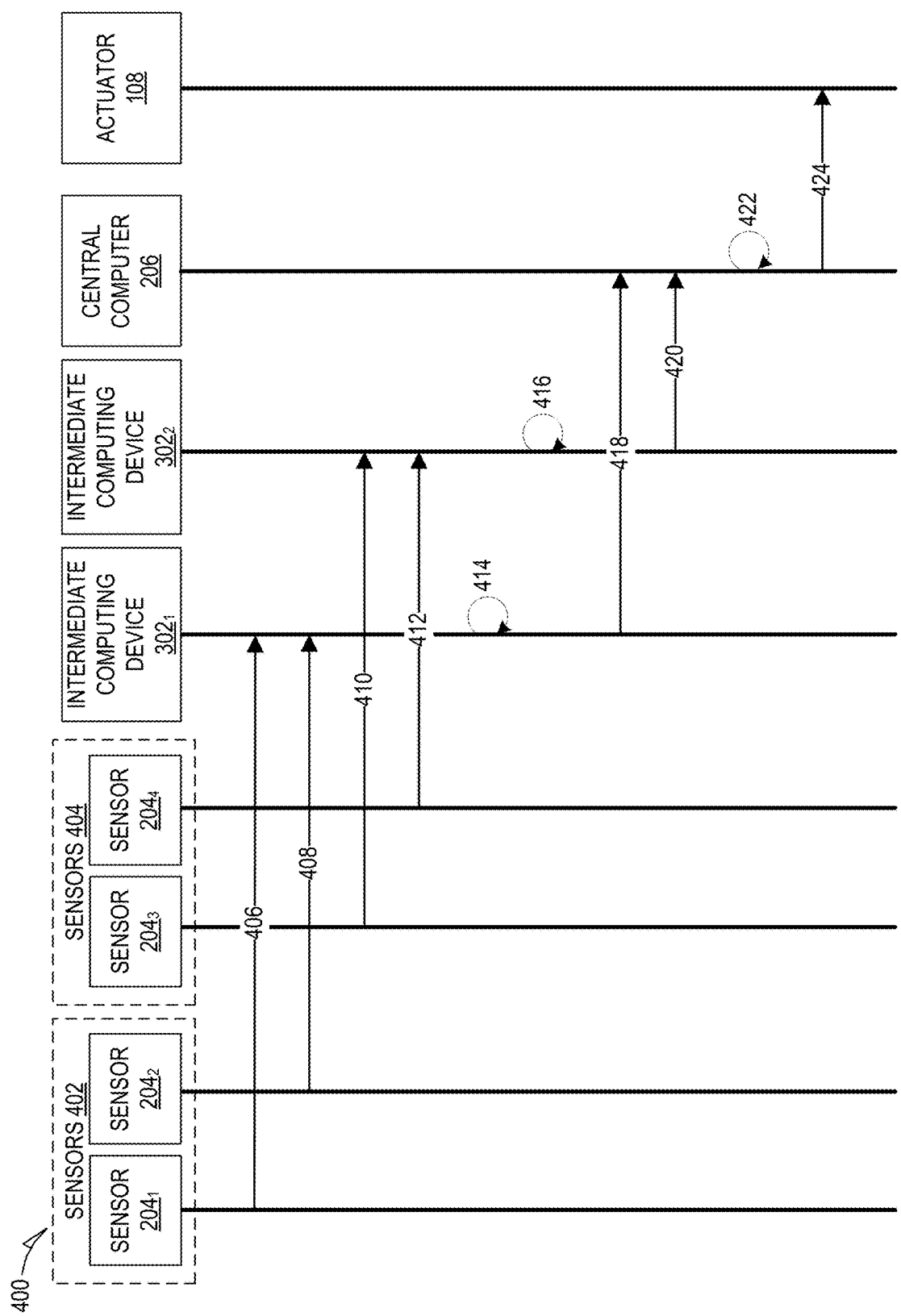
FIG. 4 is a sequence diagram showing a distributed computing architecture for aggregating sensor data, according to certain example embodiments.

FIG. 4 is a sequence diagram showing a distributed computing architecture for aggregating sensor data, according to certain example embodiments. As shown, the vehicle networking system 400 includes four sensors 204 (e.g., $204_1$, $204_2$, $204_3$, $204_4$), two intermediate computing devices 302 (e.g., $302_1$, $302_2$), a central computer 206, and an actuator 108.

Each intermediate computing device 302 receives sensor data from a separate subset (e.g., 402, 404) of the sensors 204. As shown, a first intermediate computing device $302_1$ receives sensor data from a first subset 402 of the sensors 204 included in the vehicle networking system 400, and a second intermediate computing device $302_2$ receives sensor data from a second subset 404 of the sensors 204 included in the vehicle networking system 400. That is, a first sensor $204_1$ included in the first subset 402 of sensors 204 transmits 406 sensor data to the first intermediate computing devices $302_1$, and a second sensor $204_2$ included in the first subset 402 of sensors 204 also transmits 408 sensor data to the first intermediate computing devices $302_1$. Likewise, a first sensor $204_3$ included in the second subset 404 of sensors 204 transmits 410 sensor data to the second intermediate computing devices $302_1$, and a second sensor $204_4$ included in the second subset 404 of sensors 204 transmits 412 sensor data to the second intermediate computing devices $302_2$.

The intermediate computing devices 302 aggregate the received sensor data, which is then transmitted to the central computer 206. For example, the first intermediate computing device $302_1$ aggregates 414 the sensor data received from the first subset of sensors 402, and the second intermediate computing devices $302_2$ aggregates 416 the sensor data received from the second subset of sensors 404. The first intermediate computing device $302_1$ transmits 418 the aggregated sensor data from the first subset 402 of sensors 204 to the central computer 206. Likewise, the second intermediate computing device $302_2$ transmits 420 the aggregated sensor data from the second subset 404 of sensors 204 to the central computer 206.

The central computer 206 processes 422 the aggregated sensor data received from the intermediate computing devices 302 to provide various computer managed features. For example, the central computer 206 may transmit a command 424 to the actuator 108 to perform an action determined based on the processed aggregated sensor data. As another example, the central computer 206 may transmit a command or data to a display to cause the data or a notification to be presented.

Figure 5:
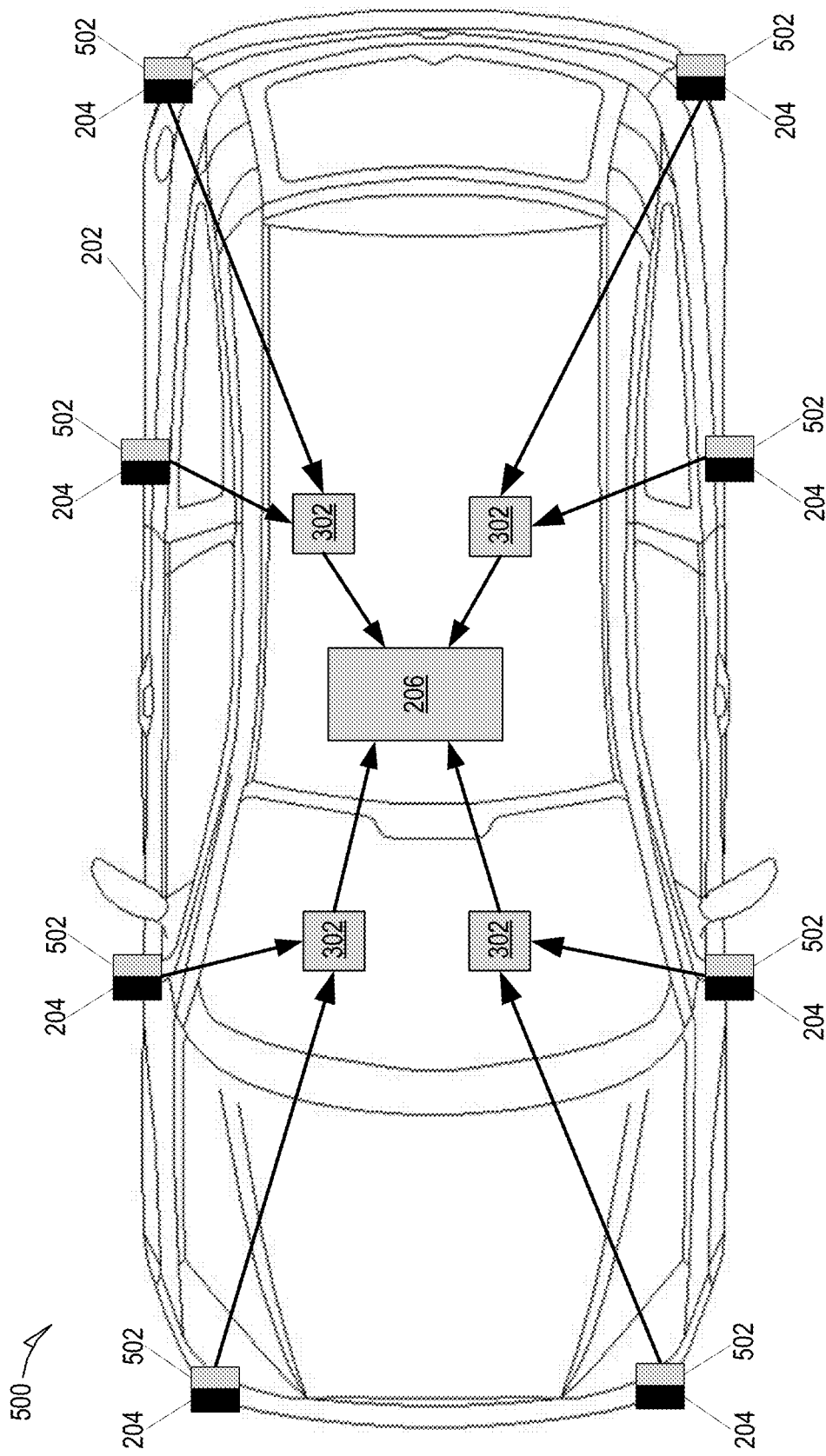
FIG. 5 is a block diagram of a vehicle networking system using a distributed computing architecture to distribute processing of sensor data, according to certain example embodiments.

FIG. 5 is a block diagram of a vehicle networking system 500 using a distributed computing architecture to distribute processing of sensor data, according to certain example embodiments. Like the vehicle networking system 300 shown in FIG. 3, the vehicle networking system 500 shown in FIG. 5, distributes the task of aggregating sensor data across multiple nodes. For example, the vehicle 202 includes intermediate computing devices 302 that receive and aggregate sensor data from sensors 204 positioned at various locations of the vehicle 202, which the intermediate computing devices 302 provide to a central computer 206. In contrast to the vehicle networking system 300 shown in FIG. 3, however, the vehicle networking system 500 distributes both aggregating and processing of the sensor data across multiple nodes. That is, the task of processing the sensor data is performed by multiple nodes in the vehicle networking system 500, rather than being performed solely by the central computer 206, as in the vehicle networking system 300 shown in FIG. 3.

To distribute the task of processing the sensor data, different portions of processing the sensor data (e.g., different portions of a data processing algorithm) may be performed at various layers of the vehicle networking system 500 as the sensor data is transmitted from the sensors 204 to the central computer 206.

As shown, each sensor 204 is paired with an edge computing device 502. The edge computing device 502 may perform an initial portion of the data processing algorithm as sensor data is captured by its corresponding sensor 204 and transmit the resulting processed sensor data to the appropriate intermediate node 302. In turn, each intermediate node 302 may perform a second portion of the data processing algorithm based on processed sensor data received from multiple sensors 204 (e.g., processed sensor data received from the edge computing device 502 of each of the multiple sensors 204) in the vehicle networking system 500. For example, the intermediate computing device 302 positioned on the front driver's side of the vehicle 202 (bottom left) performs a second portion of the data processing algorithm on processed sensor data captured by one of the sensors 204 positioned along the front of the vehicle 202 and one of the sensors 204 positioned along the driver's side of the vehicle 202. Each intermediate computing device 302 provides the processed aggregated sensor data it generates to the central computer 206, where it may be further aggregated and/or processed to provide various computer managed features.

As previously explained, processing sensor data may include performing a portion of a data processing algorithm. That is, additional portions of the data processing algorithm may be performed by other nodes in the vehicle networking system 500 that previously and/or subsequently receive the sensor data. For example, the computing devices 502 may perform a first portion of the data processing algorithm, the intermediate computing devices 302 may perform a second portion of the data processing algorithm, and the central computer 206 may perform a third portion of the data processing algorithm.

A data processing algorithm may include any of a variety of steps or operations to be performed using sensor data to provide a computer managed feature, such as analyzing the sensor data, generating additional data (e.g., metadata) based on the sensor data, filtering the sensor data, transforming the sensor data, aggregating the sensor data, making a determination based on the sensor data, etc. For example, a data processing algorithm to provide autonomous driving may include the steps of aggregating sensor data, generating a comprehensive representation of the vehicle's 202 surroundings based on the aggregated sensor data, and analyzing the comprehensive representation of the vehicle's 202 surroundings to determine which actions should be executed by the vehicle 202.

The data processing algorithm and/or portions thereof may be distributed across the various nodes of the vehicle networking system 500. For example, to provide autonomous driving, the edge computing devices 502 may perform an initial portion of generating the comprehensive representation of the vehicle's 202 surroundings. That is, each intermediate computing device 302 may generate a quadrant of the comprehensive representation of the vehicle's 202 surroundings. For example, the intermediate computing device 302 positioned on the front driver's side of the vehicle 202 (bottom left) may generate a quadrant of the comprehensive representation of the vehicle's 202 surroundings that represents the front driver's side of the vehicle 202. Similarly, the intermediate computing device 302 positioned on the front passenger's side of the vehicle 202 (top left) may generate a quadrant of the comprehensive representation of the vehicle's 202 surroundings that represents the front passenger's side of the vehicle 202. The central computer 206 generates the comprehensive representation of the vehicle's 202 surroundings by combining the quadrants of the comprehensive representation of the vehicle's 202 surroundings received from each intermediate computing device, which the central computer 206 may then use to determine which actions, if any, should be executed by the vehicle 202.

The processed sensor data transmitted from one node to another node in the vehicle networking system 500 may be larger or smaller in size than the sensor data from which it was generated. For example, an edge computing device 502 may generate additional data from raw sensor data captured by its paired sensor 204. The resulting processed sensor data transmitted to the intermediate computing node 302 may include both the additional data generated by the edge computing device 502 and the raw sensor data captured by the sensor 204. For example, the edge computing device may use the raw sensor data to validate the additional data generated by the computing device 502. Accordingly, in this type of embodiment, the processed sensor data transmitted between the nodes is larger in size than the raw sensor data from which the processed sensor data was generated. Conversely, an intermediate computing device 302 that receives processed sensor data including both raw sensor data and additional data may generate aggregated sensor data that does not include the raw sensors data. Accordingly, the aggregated sensor data may be smaller in size than the processed sensor data from which it was generated.

Further, the nodes of the vehicle networking system 500 may transmit data directly to more than one other node. For example, a sensor 204 may be connected to and transmit processed sensor data to more than one intermediate node 302. That is, the edge computing device 502 paired to the sensor 204 may process the sensor data captured by the sensor 204 and transmit the processed sensor data to multiple intermediate nodes 302. This may include transmitting the entirety of the processed sensor data to each of the intermediate nodes 302 and/or transmitting different subsets of the processed sensor date to each of the intermediate nodes 302.

Figure 6:
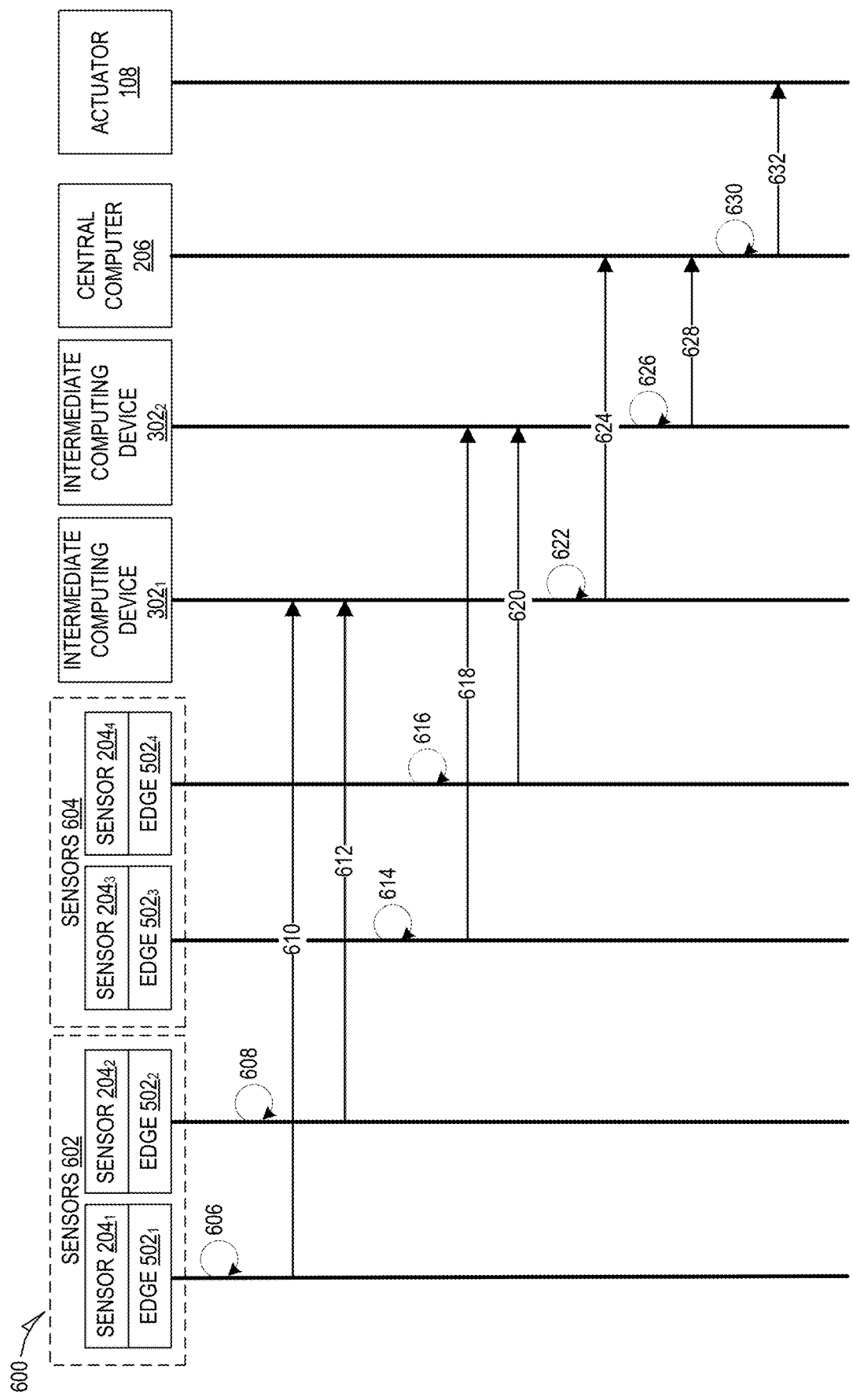
FIG. 6 is a sequence diagram showing a distributed computing architecture for distributing processing of sensor data in a vehicle networking system, according to certain example embodiments.

FIG. 6 is a sequence diagram showing a distributed computing architecture for distributing processing of sensor data in a vehicle networking system 600, according to certain example embodiments. As shown, the vehicle networking system 600 includes four sensors 204 (e.g., $204_1$, $204_2$, $204_3$, $204_4$), four corresponding edge computing devices 502 (e.g., $502_1$, $502_2$, $502_3$, $502_4$), two intermediate computing devices 302 (e.g., $302_1$, $302_2$), a central computer 206, and an actuator 108.

Each intermediate computing device 302 receives processed sensor data from a separate subset (e.g., 602, 604) of the sensors 204 in the vehicle networking system 600. As shown, a first intermediate computing device $302_1$ receives processed sensor data from a first subset 602 of the sensors 204 included in the vehicle networking system 600, and a second intermediate computing device $302_2$ receives processed sensor data from a second subset 604 of the sensors 204 included in the vehicle networking system 600. For example, an edge computing device $502_1$ paired to a first sensor $204_1$ included in the first subset 602 of sensors 204 processes 606 sensor data capture by the first sensor $204_1$, which is transmitted 610 to the first intermediate computing device $302_1$, and an edge computing device $502_2$ paired to a second sensor $204_2$ included in the first subset 602 of sensors 204 processes 608 sensor data capture by the second sensor $204_2$, which is transmitted 620 to the first intermediate computing device $302_1$.

Similarly, an edge computing device $502_3$ paired to a first sensor $204_3$ included in the second subset 604 of sensors 204 processes 614 sensor data capture by the first sensor $204_3$, which is transmitted 618 to the second intermediate computing device $302_2$, and an edge computing device $502_4$ paired to a second sensor $204_4$ included in the second subset 604 of sensors 204 processes 616 sensor data capture by the second sensor $204_4$, which is transmitted 620 to the second intermediate computing device $302_2$.

The processed sensor data transmitted by the sensors 204 to the intermediate computing nodes 302 may be larger in size than the sensor data from which it was generated. For example, the processed sensor data transmitted to the intermediate computing nodes 302 may include additional data generated by the edge computing devices 502 and the raw sensor data captured by the sensors 204.

The intermediate computing devices 302 aggregate and/or additionally process the processed sensor data received from the sensors 204 and transmit the resulting processed aggregated sensor data to the central computer 206. For example, the first intermediate computing device $302_1$ processes 622 the sensor data received from the first subset of sensors 602, and the second intermediate computing devices $302_2$ processes 626 the sensor data received from the second subset of sensors 604. The first intermediate computing device $302_1$ transmits 624 the processed aggregated sensor data from the first subset 602 of sensors 204 to the central computer 206. Likewise, the second intermediate computing device $302_2$ transmits 628 the processed aggregated sensor data from the second subset 604 of sensors 204 to the central computer 206.

The central computer 206 processes 630 the processed aggregated sensor data received from the intermediate computing devices 302 to provide various computer managed features. For example, the central computer 206 may transmit a command 632 to the actuator 108 to perform an action determined based on the processed aggregated sensor data. As another example, the central computer 206 may transmit a command to a display or other output device to present an alert, notification, or the like.

Figure 7:
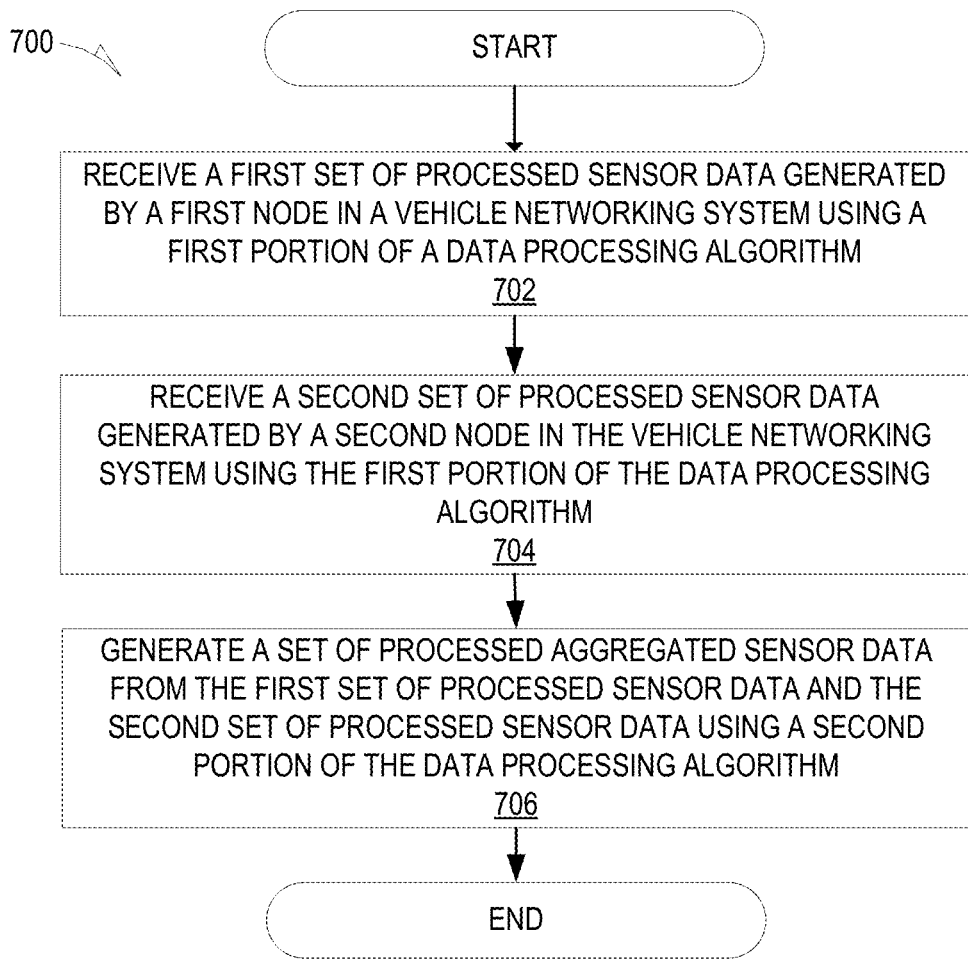
FIG. 7 is a flowchart showing a method of distributing processing of sensor data in a vehicle networking system, according to certain example embodiments.

FIG. 7 is a flowchart showing a method 700 of distributing processing of sensor data in a vehicle networking system 600, according to certain example embodiments, according to certain example embodiments. The method 700 may be embodied in computer readable instructions for execution by one or more processors such that the operations of the method 700 may be performed in part or in whole by a computing device 106 in a vehicle networking system 600 (e.g., intermediate computing device 302, central computer 206); accordingly, the method 700 is described below by way of example with reference to an intermediate computing device 302. However, it shall be appreciated that at least some of the operations of the method 700 may be deployed on various other hardware configurations and the method 700 is not intended to be limited to the intermediate computing device 302.

At operation 702, the intermediate computing device 302 receives a first set of processed sensor data generated by a first node in a vehicle networking system 600 using a first portion of a data processing algorithm. For example, the first node may be a first sensor $204_1$ paired with a first edge computing device $502i$. The first set of processed sensor data may be generated by the first edge computing device $502_1$ from raw sensor data captured by the first sensor $204_1$. In some embodiments, the first set of processed sensor data may include the raw sensor data captured by the first sensor $204_1$ as well as additional data generated by the first edge computing device $502_1$. Alternatively, in some embodiments, the first set of processed sensor data may include only a subset or none of the raw sensor data captured by the first sensor $204_1$.

At operation 704, the intermediate computing device 302 receives a second set of processed sensor data generated by a second node in the vehicle networking system 600 using the first portion of the data processing algorithm. For example, the second node may be a second sensor $204_2$ paired with a second edge computing device $502_2$. The second set of processed sensor data may be generated by the second edge computing device $502_2$ from raw sensor data captured by the second sensor $204_2$ by performing the same steps used by the first edge computing device $502_1$ to generate the first set of processed sensor data from the raw sensor data captured by the first sensor $204_1$.

At operation 706, the intermediate computing device 302 generates a set of processed aggregated sensor data from the first set of processed sensor data and the second set of processed sensor data using a second portion of the data processing algorithm. For example, the intermediate computing device 302 may perform a different set of steps than those performed by the first edge computing device $502_1$ and the second edge computing device $502_2$ to generate the first set of processed sensor data and the second set of processed sensor data. In some embodiments, the set of aggregated processed sensor data may be smaller in size than the first set of processed sensor data and the second set of processed sensor data from which it was generated. For example, the first set of processed sensor data and the second set of processed sensor data may include raw sensor data captured by the first sensor $204_1$ and the second sensor $204_2$, which may not be included in the aggregated processed sensor data.

Figure 8:
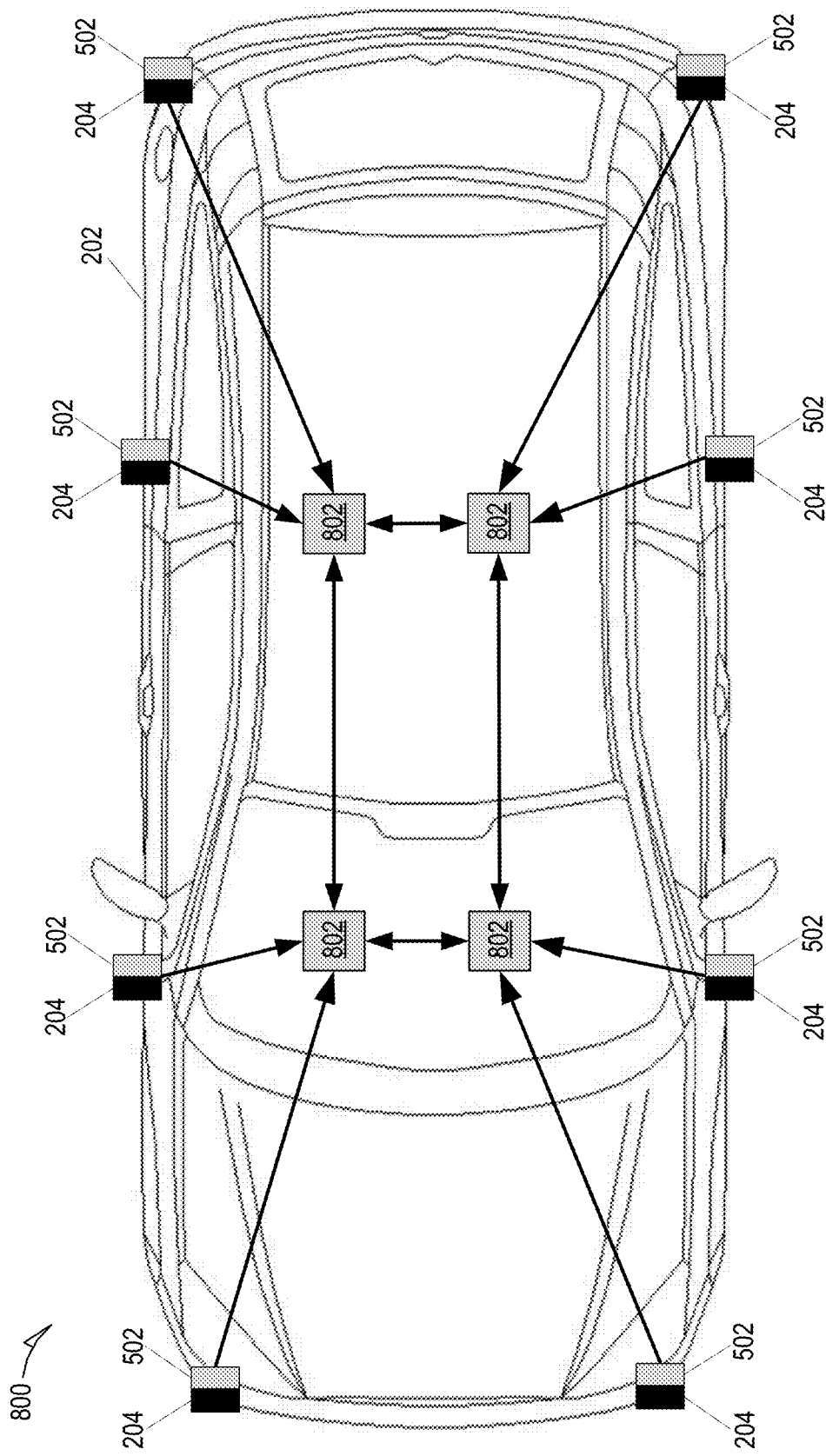
FIG. 8 is a block diagram of a vehicle networking system that uses distributed central computers, according to certain example embodiments.

FIG. 8 is a block diagram of a vehicle networking system 800 that uses distributed central computers 802, according to certain example embodiments. As shown, the vehicle networking system 800 includes four distributed central computers 802. This contrasts with the vehicle networking system 500 shown in FIG. 5, which includes a single central computer 206.

In the vehicle networking system 800 shown in FIG. 8, the functionality of the single central computer 206 is distributed across multiple distributed central computers 802. For example, each distributed central computer 802 may be tasked with providing a subset of the computer managed features provided by the vehicle networking system 800 and/or a portion of the tasks to provide one or more of the computer managed features. For example, one of the distributed central computers 802 may be tasked with providing a computer managed feature, such as providing autonomous driving, including the related tasks of aggregating sensor data, generating a comprehensive representation of the vehicle's 202 surroundings based on the aggregated sensor data, and analyzing the comprehensive representation of the vehicle's 202 surroundings to determine which actions should be executed by the vehicle 202.

Alternatively, the individual tasks performed to provide a computer managed feature may be distributed across multiple distributed central computers 802. For example, to provide autonomous driving, one of the distributed central computers 802 may be tasked with aggregating the sensor data, another distributed central computer 802 may be tasked with generating a comprehensive representation of the vehicle's 202 surroundings, and a third distributed central computer 802 may be tasked with analyzing the comprehensive representation of the vehicle's 202 surroundings to determine which actions should be executed by the vehicle 202.

As with the vehicle networking system 500 shown in FIG. 5, the vehicle networking system 800 shown in FIG. 8 includes sensors 204 paired with edge computing device 502 that are located at various locations of the vehicle 202. The edge computing devices 502 perform an initial portion of processing of the sensor data gathered by their corresponding sensor 204.

Each distributed central computer 802 receives processed sensor data from a subset of the sensors 204 in the vehicle networking system 800. The distributed central computer 802 may perform additional processing of the received processed sensor data and/or transmit the processed aggregated sensor data to another distributed central computer 802 in the vehicle networking system 800. Likewise, each distributed central computer 802 may receive processed aggregated sensor data from the other distributed central computers 802 in the vehicle networking system 800. In this way, each distributed central computer 802 may perform some functionality of a central computer and an intermediate computing device 302.

As explained earlier, each distributed central computer 802 may provide a computer managed feature or individual task related to providing a computer managed feature. As such, each distributed central computer 802 may need to receive processed sensor data from other distributed central computers 802 in the vehicle networking system 800 and/or to transmit processed sensor data to other distributed central computer 802 in the vehicle networking system. Accordingly, the distributed central computers 802 are equipped to communicate with each other to share data. For example, each distributed central computer 802 may transmit requests to other distributed central computers 802 for needed data, which may be returned in response. Similarly, distributed central computer 802 may automatically provide some sensor data to other distributed central computers 802. For example, a distributed central computer 802 that generates a comprehensive representation of the vehicle's 202 surroundings to provide an autonomous driving feature may automatically provide the resulting data to another distributed central computer 802 that analyses the comprehensive representation of the vehicle's 202 surroundings to determine which actions should be executed by the vehicle 202. The sensor data shared amongst the distributed central computers 802, as well as the other nodes of the vehicle networking system 800, may include raw sensor data as well as processed sensor data. For example, a distributed central computer 802 that generates a comprehensive representation of the vehicle's 202 surroundings to provide an autonomous driving feature may provide the resulting data and the raw sensor data to another distributed central computer 802 in the vehicle networking system 800.

Figure 9:
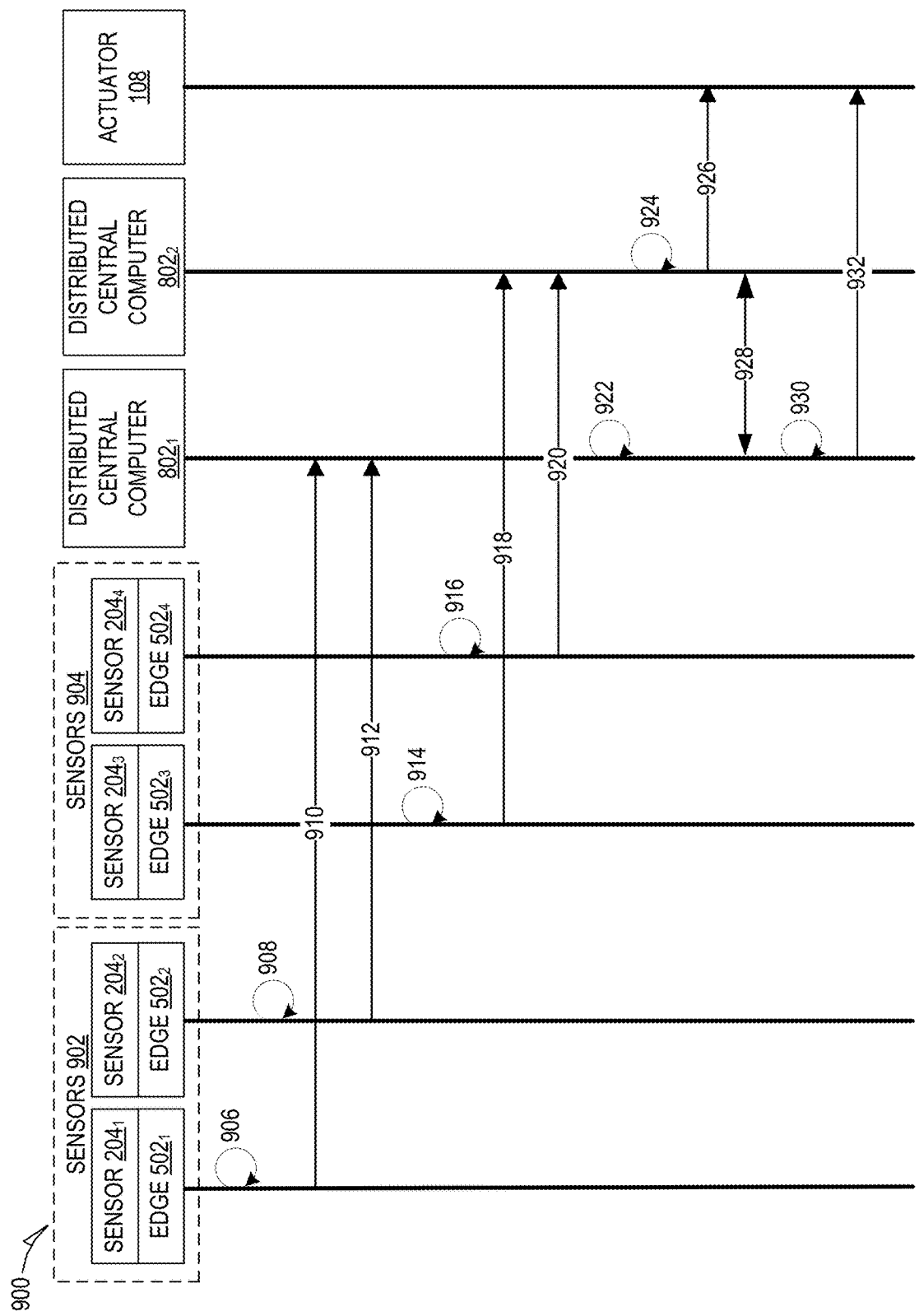
FIG. 9 is a sequence diagram showing a vehicle networking system that uses distributed central computers, according to certain example embodiments.

FIG. 9 is a sequence diagram showing a vehicle networking system 900 that uses distributed central computers 802, according to certain example embodiments. As shown, the vehicle networking system 900 includes four sensors 204 (e.g., $204_1$, $204_2$, $204_3$, $204_4$), four corresponding edge computing devices 502 (e.g., $502_1$, $502_2$, $502_3$, $502_4$), two distributed central computers 802 (e.g., $802_1$, $802_2$), and an actuator 108.

Each distributed central computer 802 receives processed sensor data from a separate subset (e.g., 902, 904) of the sensors 204 in the vehicle networking system 900. As shown, a first distributed central computer $802_1$ receives processed sensor data from a first subset 902 of the sensors 204 included in the vehicle networking system 900, and a second distributed central computer $802_2$ receives processed sensor data from a second subset 904 of the sensors 204 included in the vehicle networking system 900. For example, an edge computing device $502_1$ paired to a first sensor $204_1$ included in the first subset 902 of sensors 204 processes 906 sensor data capture by the first sensor $204_1$, which is transmitted 910 to the first distributed central computer $802_1$, and an edge computing device $502_2$ paired to a second sensor $204_2$ included in the first subset 902 of sensors 204 processes 908 sensor data capture by the second sensor $204_2$, which is transmitted 920 to the first distributed central computer $802_1$.

Similarly, an edge computing device $502_3$ paired to a first sensor $204_3$ included in the second subset 904 of sensors 204 processes 914 sensor data capture by the first sensor $204_3$, which is transmitted 918 to the second distributed central computer $802_2$, and an edge computing device $502_4$ paired to a second sensor $204_4$ included in the second subset 904 of sensors 204 processes 916 sensor data captured by the second sensor $204_4$, which is transmitted 920 to the second distributed central computer $802_2$.

The distributed central computers 802 may further process the processed sensor data received from the sensors 204 to provide a computer managed function and/or transmit the resulting processed aggregated sensor data to another distributed central computer 204 in the vehicle network system 900. For example, the first distributed central computer $802_1$ processes 922 the processed sensor data received from the first subset of sensors 902, and the second distributed central compute $802_2$ processes 926 the processed sensor data received from the second subset of sensors 904.

Each distributed central computer 802 may provide an output based solely on the processed sensor data they receive from a subset of the sensors, such as causing an action to be performed as part of a computer managed feature. For example, a distributed central computer 802 providing a climate control function may receive sensor data describing the current climate in the vehicle from the sensors 204 that captured the sensor data, and cause a change to the climate settings in the vehicle 202 based on the received sensor data. That is, the distributed central computer 802 does not request additional sensor data from another distributed central computer 802 to provide the climate control function. An example of this is illustrated in relation to the second distributed central computer $802_2$, which transmits a command 926 to the actuator based on the processed sensor data received from the second subset of sensors 904.

Alternatively, a distributed central computer 802 may provide an output based on the processed sensor data it receives directly from sensors 204, as well as additional processed sensor data (e.g., aggregated processes sensor data) received from other distributed central computers 802 in the vehicle networking system 900. For example, a distributed central computer 802 providing autonomous driving functionality may receive aggregated processed sensor data from other distributed central computers 802 that provides a comprehensive representation of the vehicle's 202 surroundings, or a portion thereof, which the distributed central computer 802 then uses to determine what actions to perform and transmit corresponding commands.

In this type of situation, a distributed central computer 802 may transmit a request to another distributed central computer 802 for processed sensor data and/or automatically receive processed sensor data from another distributed central computer 802. An example of this is illustrated in relation to the first distributed central computer $802_1$, which communicates 928 with the second distributed central computer $802_2$ to receive processed sensor data from the second distributed central computer $802_2$. For example, the first distributed central computer $802_1$ may transmits a request to the second distributed central computer $802_2$ for the processed sensor data, which the second distributed central computer $802_2$ may return in response. Alternatively, the second distributed central computer $802_2$ may automatically transmits the processed sensor data to the first distributed central computer $802_1$.

The first distributed central computer $802_1$ then processes 930 the processed sensor data received from the second distributed central computer $802_2$ in addition to the processes sensor data received from first subset 904 of the sensors 204. The first distributed central computer $802_1$ may then transmit a command 932 to the actuator based on the processed sensor data received from both the first subset of sensors 902 and the second distributed central computer $802_2$. As another example, the first distributed central computer $802_1$ may then transmit a command to an output device to present an output, such as a notification or alert.

Figure 10:
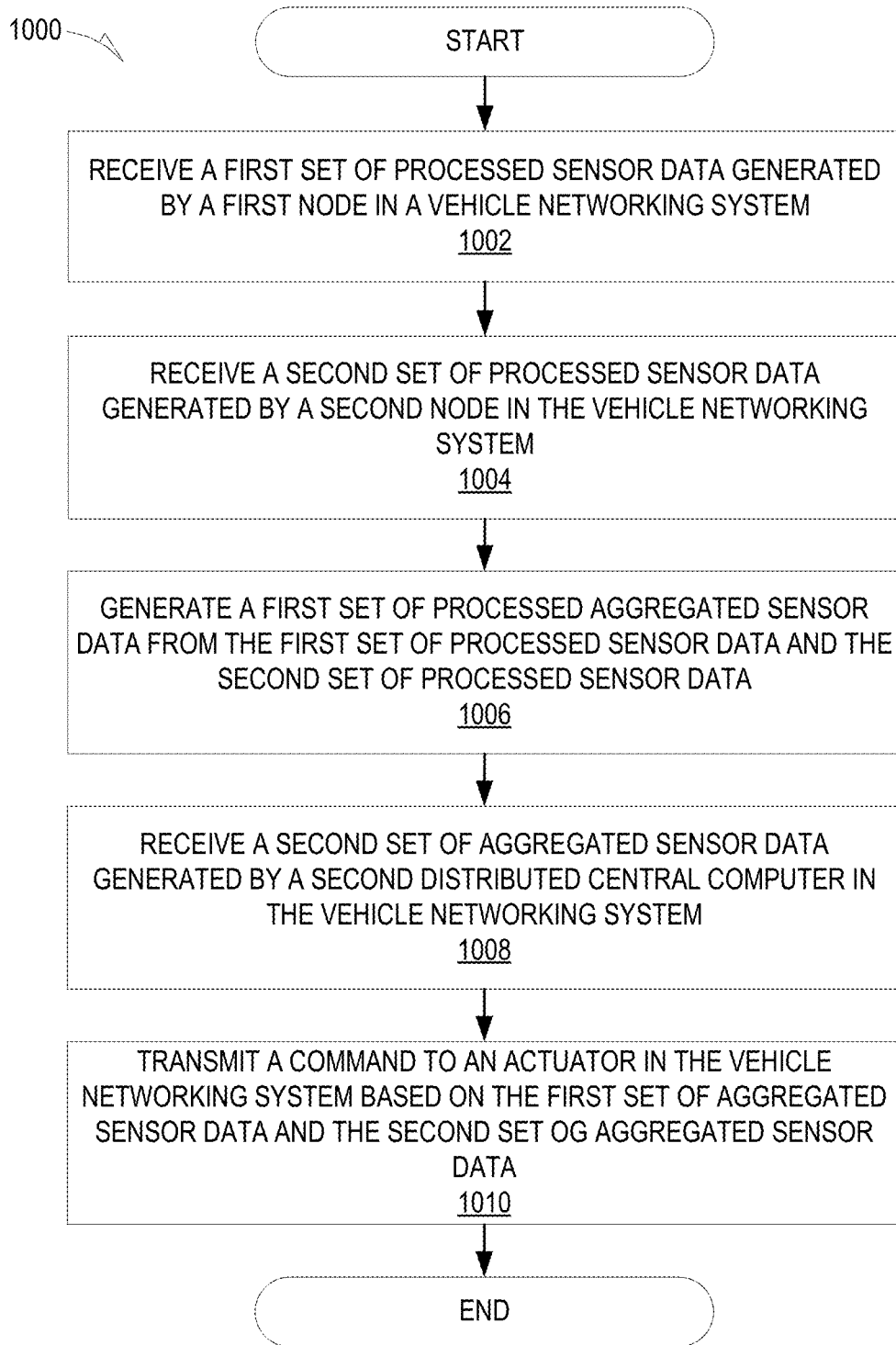
FIG. 10 is a flowchart showing a method of using distributed central computers in a vehicle networking system, according to certain example embodiments.

FIG. 10 is a flowchart showing a method 1000 of using distributed central computers 802 in a vehicle networking system 900, according to certain example embodiments. The method 1000 may be embodied in computer readable instructions for execution by one or more processors such that the operations of the method 1000 may be performed in part or in whole by a distributed central computer 802; accordingly, the method 1000 is described below by way of example with reference to a distributed central computer 802. However, it shall be appreciated that at least some of the operations of the method 1000 may be deployed on various other hardware configurations and the method 1000 is not intended to be limited to a distributed central computer 802.

At operation 1002, a first distributed central computer $802_1$ receives a first set of processed sensor data generated by a first node in a vehicle networking system 900. For example, the first node may be a first sensor $204_1$ paired with a first edge computing device $502_1$, or an intermediate computing device 302. In embodiments in which the first node is a first edge computing device $502_1$, the first set of processed sensor data may be generated by the first edge computing device $502_1$ from raw sensor data captured by the first sensor $204_1$. In some embodiments, the first set of processed sensor data may include the raw sensor data captured by the first sensor $204_1$ as well as additional data generated by the first edge computing device $502_1$. Alternatively, in some embodiments, the first set of processed sensor data may include only a subset or none of the raw sensor data captured by the first sensor $204_1$.

At operation 1004, the first distributed central computer $802_1$ receives a second set of processed sensor data generated by a second node in the vehicle networking system 900. For example, the second node may be a second sensor $204_2$ paired with a second edge computing device $502_2$, or a different intermediate computing device 302. In embodiments in which the second node is a second edge computing device $502_2$, the second set of processed sensor data may be generated by the second edge computing device $502_2$ from raw sensor data captured by the second sensor $204_2$. For example, the second set of processed sensor data may be generated by the second edge computing device $502_2$ from raw sensor data captured by the second sensor $204_2$ by performing the same steps used by the first edge computing device $502_1$ to generate the first set of processed sensor data from the raw sensor data captured by the first sensor $204_1$.

At operation 1006, the first distributed central computer $802_1$ generates a first set of processed aggregated sensor data based on the first set of processed sensor data and the second set of processed sensor data. For example, the first distributed central computer $802_1$ may perform a different set of steps than those performed by the first edge computing device $502_1$ and the second edge computing device $502_2$ to generate the first set of processed sensor data and the second set of processed sensor data. In some embodiments, the set of aggregated processed sensor data may be smaller in size than the first set of processed sensor data and the second set of processed sensor data from which it was generated. For example, the first set of processed sensor data and the second set of processed sensor data may include raw sensor data captured by the first sensor $204_1$ and the second sensor $204_2$, which may not be included in the aggregated processed sensor data.

The first distributed central computer $802_1$ may be tasked with providing a subset of computer managed features provided by the vehicle networking system 900. To provide some of the computer managed feature, the first distributed central computer $802_1$ may require aggregated sensor data generated by other distributed central computers 802 in the vehicle networking system 900. Accordingly, at operation 1008, the first distributed central computer $802_1$ receives a second set of aggregated sensor data generated by a second distributed central computer $802_2$ in the vehicle networking system 900.

The second distributed central computer $802_2$ generates the second set of processed aggregated sensor data from processed sensor data received by nodes of the vehicle networking system 900 that do not directly provide processed sensor data to the first distributed central computer $802i$. For example, the second distributed central computer $802_2$ may generate the second set of aggregated sensor data from processed sensor data received from sensors 204 or intermediate computing devices 302 that communicate directly with the second distributed central computer $802_2$ but do not communicate directly with the first distributed central computer $802_1$.

The first distributed central computer $802_1$ may receive the second set of processed aggregates sensor data from the second distributed central computer $802_2$ as a result of transmitting a request to the second distributed central computer $802_2$ for the second set of processed aggregated sensor data and/or as a result of an automatic transmission from the second distributed central computer $802_2$.

At operation 1010, the first distributed central computer $802_1$ transmits a command to an actuator 108 in the vehicle networking system 900 based on an analysis of the first set of processed aggregated sensor data and the second set of processed aggregated sensor data. For example, the command may be to cause a specified action in the vehicle 202 based on the first set of processed aggregated sensor data and the second set of processed aggregated sensor data, such as to modify a setting of an internal system of the vehicle 202, adjust the speed of the vehicle 202, alter the steering direction of the vehicle 202, etc.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 11:
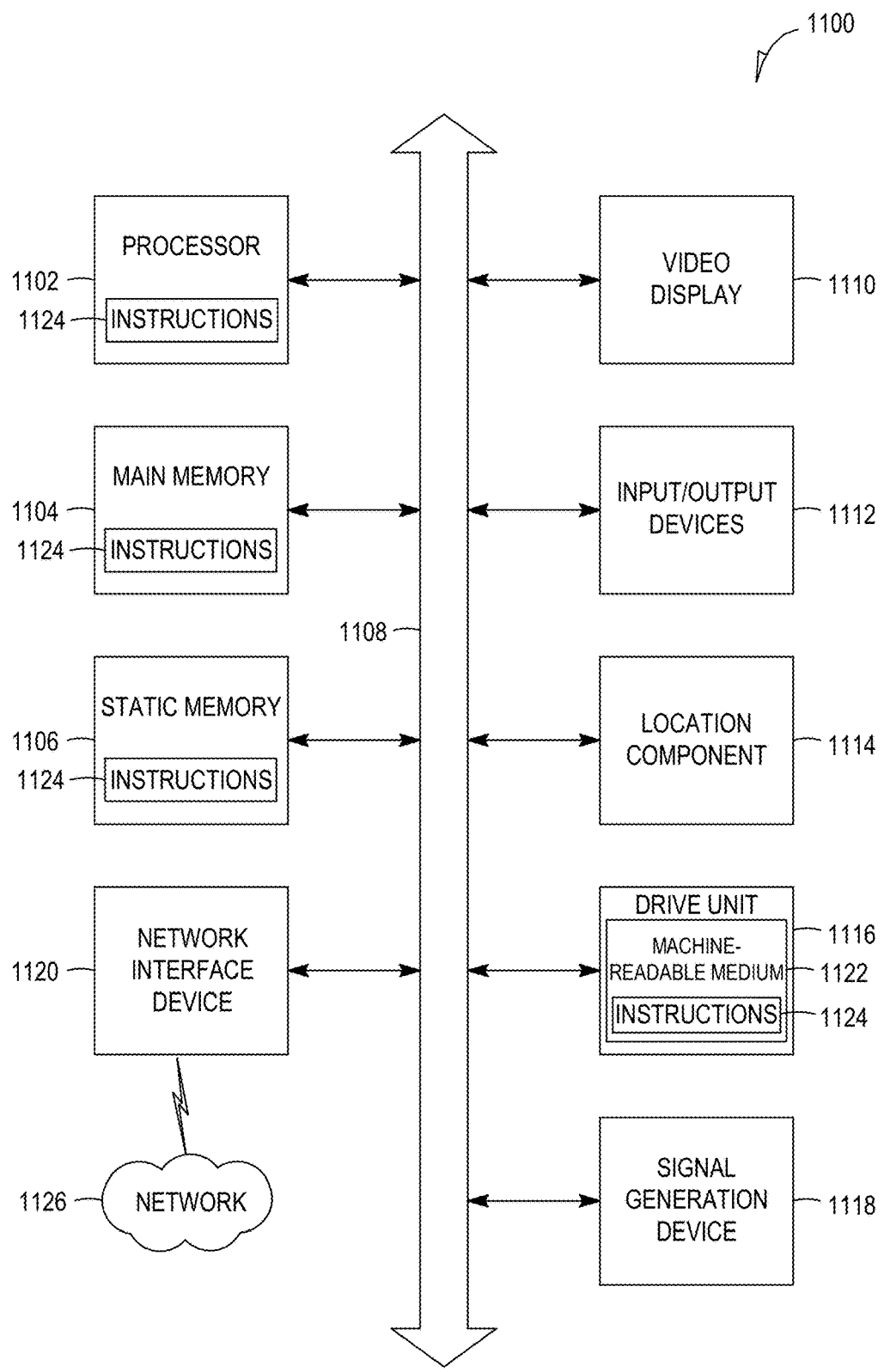
FIG. 11 is a diagrammatic representation of a machine in the example form of a computer system within which a set of instructions for causing the machine to perform any one or more of the methodologies discussed herein may be executed.

FIG. 11 is a diagrammatic representation of a machine in the example form of a computer system 1100 within which a set of instructions for causing the machine to perform any one or more of the methodologies discussed herein may be executed. The computer system 1100 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine may, for example, be a personal computer (PC), a PDA, a cellular telephone, a smart phone (e.g., iPhone®), a tablet computer, a web appliance, a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display 1110 (e.g., a liquid crystal display (LCD) or a cathode ray tube (CRT)). The computer system 1100 also includes one or more input/output (I/O) devices 1112, a location component 1114, a drive unit 1116, a signal generation device 1118 (e.g., a speaker), and a network interface device 1120. The I/O devices 1112 may, for example, include a keyboard, a mouse, a keypad, a multi-touch surface (e.g., a touchscreen or track pad), a microphone, a camera, and the like.

The location component 1114 may be used for determining a location of the computer system 1100. In some embodiments, the location component 1114 may correspond to a GPS transceiver that may make use of the network interface device 1120 to communicate GPS signals with a GPS satellite. The location component 1114 may also be configured to determine a location of the computer system 1100 by using an internet protocol (IP) address lookup or by triangulating a position based on nearby mobile communications towers. The location component 1114 may be further configured to store a user-defined location in main memory 1104 or static memory 1106. In some embodiments, a mobile location enabled application may work in conjunction with the location component 1114 and the network interface device 1120 to transmit the location of the computer system 1100 to an application server or third-party server for the purpose of identifying the location of a user operating the computer system 1100.

In some embodiments, the network interface device 1120 may correspond to a transceiver and antenna. The transceiver may be configured to both transmit and receive cellular network signals, wireless data signals, or other types of signals via the antenna, depending on the nature of the computer system 1100.

Machine-Readable Medium

The drive unit 1116 includes a machine-readable medium 1122 on which is stored one or more sets of data structures and instructions 1124 (e.g., software) embodying or used by any one or more of the methodologies or functions described herein. The instructions 1124 may also reside, completely or at least partially, within the main memory 1104, the static memory 1106, and/or the processor 1102 during execution thereof by the computer system 1100, with the main memory 1104, the static memory 1106, and the processor 1102 also constituting machine-readable media.

Consistent with some embodiments, the instructions 1124 may relate to the operations of an operating system (OS). Depending on the particular type of the computer system 1100, the OS may, for example, be the iOS® operating system, the Android® operating system, a BlackBerry® operating system, the Microsoft® Windows® Phone operating system, Symbian® OS, or webOS®. Further, the instructions 1124 may relate to operations performed by applications (commonly known as "apps"), consistent with some embodiments. One example of such an application is a mobile browser application that displays content, such as a web page or a user interface using a browser.

While the machine-readable medium 1122 is shown in an example embodiment to be a single medium, the term "machine-readable medium" may include a single medium or multiple media (e.g., a centralized or distributed database, and/or associated caches and servers) that store the one or more data structures or instructions 1124. The term "machine-readable medium" shall also be taken to include any tangible medium that is capable of storing, encoding, or carrying instructions (e.g., instructions 1124) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 1124 may further be transmitted or received over a network 1126 using a transmission medium. The instructions 1124 may be transmitted using the network interface device 1120 and any one of a number of well-known transfer protocols (e.g., HTTP). Examples of communication networks include a LAN, a WAN, the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 1124 for execution by the machine, and includes digital or analog communications signals or other intangible media to facilitate communication of such software.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
    receiving, by a first node in a vehicle networking system, a first set of processed sensor data transmitted by a second node in the vehicle networking system, the first set of processed sensor data having been generated by the second node as a result of the second node performing a first portion of a data processing algorithm based on a first set of sensor data captured by a first set of sensors of the vehicle networking system;
    receiving, by the first node in the vehicle networking system, a second set of processed sensor data transmitted by a third node in the vehicle networking system, the second set of processed sensor data having been generated by the third node as a result of the third node performing the first portion of the data processing algorithm based on a second set of sensor data captured by a second set of sensors of the vehicle networking system; and
    performing, by the first node in the vehicle networking system, a second portion of the data processing algorithm based on the first set of processed sensor data received from the second node and the second set of processed sensor data received from the third node, yielding a first set of processed aggregated sensor data.

2. The method of claim 1, further comprising:
    transmitting the first set of processed aggregated sensor data to a fourth node in the vehicle networking system, the fourth node performing a third portion of the data processing algorithm based on the first set of processed aggregated sensor data and a second set of processed aggregated sensor data transmitted to the fourth node by a fifth node in the vehicle networking system.

3. The method of claim 1, further comprising:
    transmitting a command to an actuator of the vehicle networking system based on the first set of processed aggregated sensor data.

4. The method of claim 1, wherein the second node includes the first set of sensors.

5. The method of claim 1, wherein the first set of processed sensor data includes the first set of sensor data captured by the first set of sensors of the vehicle networking system and a first set of additional data generated by the second node.

6. The method of claim 5, wherein the second set of processed sensor data includes the second set of sensor data captured by the second set of sensors of the vehicle networking system and a second set of additional data generated by the third node.

7. The method of claim 5, wherein the first set of processed aggregated sensor data does not include at least a portion of the first set of sensor data included in the first set of processed sensor data.

8. The method of claim 1, further comprising:
    receiving, from a fourth node in the vehicle networking system, a request for the first set of processed aggregated sensor data; and
    providing the first set of processed aggregated sensor data to the fourth node in response to the request, the fourth node using the first set of processed aggregated sensor data to provide a first service in relation to the vehicle networking system.

9. The method of claim 1, further comprising:
    transmitting, to a fourth node in the vehicle networking system, a request for a second set of processed aggregated sensor data generated by the fourth node;
    receiving the second set of processed aggregated sensor data generated from the fourth node; and
    providing a first service in relation to the vehicle networking system based on the first set of processed aggregated sensor data generated by the second node and the second set of processed aggregated sensor data generated by the fourth node.

10. The method of claim 9, wherein the fourth node generates the second set of processed aggregated sensor data based on a third set of processed sensor data received by the fourth node from a fifth node in the vehicle networking system.

11. A node in a vehicle networking system, the node comprising:
    one or more computer processors; and
    one or more computer-readable mediums storing instructions that, when executed by the one or more computer processors, cause the node to perform operations comprising:
        receiving a first set of processed sensor data from a second node in the vehicle networking system, the first set of processed sensor data having been generated by the second node as a result of the second node performing a first portion of a data processing algorithm based on a first set of sensor data captured by a first set of sensors of the vehicle networking system;
        receiving a second set of processed sensor data from a third node in the vehicle networking system, the second set of processed sensor data having been generated by the third node as a result of the third node performing the first portion of the data processing algorithm based on a second set of sensor data captured by a second set of sensors of the vehicle networking system; and
        performing a second portion of the data processing algorithm based on the first set of processed sensor data received from the second node and the second set of processed sensor data received from the third node, yielding a first set of processed aggregated sensor data.

12. The node of claim 11, the operations further comprising:
    transmitting the first set of processed aggregated sensor data to a fourth node in the vehicle networking system, the fourth node performing a third portion of the data processing algorithm based on the first set of processed aggregated sensor data and a second set of processed aggregated sensor data transmitted to the fourth node by a fifth node in the vehicle networking system.

13. The node of claim 11, the operations further comprising:
transmitting a command to an actuator of the vehicle networking system based on the first set of processed aggregated sensor data.

14. The node of claim 11, wherein the second node includes the first set of sensors.

15. The node of claim 11, wherein the first set of processed sensor data includes the first set of sensor data captured by the first set of sensors of the vehicle networking system and a first set of additional data generated by the second node.

16. The node of claim 15, wherein the second set of processed sensor data includes the second set of sensor data captured by the second set of sensors of the vehicle networking system and a second set of additional data generated by the third node.

17. The node of claim 15, wherein the first set of processed aggregated sensor data does not include at least a portion of the first set of sensor data included in the first set of processed sensor data.

18. The node of claim 11, the operations further comprising:
receiving, from a fourth node in the vehicle networking system, a request for the first set of processed aggregated sensor data; and
providing the first set of processed aggregated sensor data to the fourth node in response to the request, the fourth node using the first set of processed aggregated sensor data to provide a first service in relation to the vehicle networking system.

19. The node of claim 11, the operations further comprising:
transmitting, to a fourth node in the vehicle networking system, a request for a second set of processed aggregated sensor data generated by the fourth node, wherein the fourth node generates the second set of processed aggregated sensor data based on a third set of processed sensor data received by the fourth node from a fifth node in the vehicle networking system;
receiving the second set of processed aggregated sensor data generated from the fourth node; and
providing a first service in relation to the vehicle networking system based on the first set of processed aggregated sensor data generated by the second node and the second set of processed aggregated sensor data generated by the fourth node.

20. A non-transitory computer-readable mediums storing instructions that, when executed by one or more computer processors of a node in a vehicle networking system, cause the node to perform operations comprising:
receiving a first set of processed sensor data from a second node in the vehicle networking system, the first set of processed sensor data having been generated by the second node as a result of the second node performing a first portion of a data processing algorithm based on a first set of sensor data captured by a first set of sensors of the vehicle networking system;
receiving a second set of processed sensor data from a third node in the vehicle networking system, the second set of processed sensor data having been generated by the third node as a result of the third node performing the first portion of the data processing algorithm based on a second set of sensor data captured by a second set of sensors of the vehicle networking system; and
performing a second portion of the data processing algorithm based on the first set of processed sensor data received from the second node and the second set of processed sensor data received from the third node, yielding a first set of processed aggregated sensor data.

* * * * *